United States Patent
Lu et al.

(10) Patent No.: US 12,439,431 B2
(45) Date of Patent: Oct. 7, 2025

(54) METHODS AND SYSTEMS FOR SCHEDULING MMWAVE COMMUNICATIONS USING REINFORCEMENT LEARNING

(71) Applicant: Toyota Motor Engineering & Manufacturing North America, Inc., Plano, TX (US)

(72) Inventors: Hongsheng Lu, San Jose, CA (US); Chenyuan He, Jiangsu (CN); Bin Cheng, New York, NY (US); Takayuki Shimizu, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1078 days.

(21) Appl. No.: 17/354,045

(22) Filed: Jun. 22, 2021

(65) Prior Publication Data

US 2022/0408408 A1    Dec. 22, 2022

(51) Int. Cl.
  *H04W 72/30*    (2023.01)
  *G05B 13/02*    (2006.01)
  *H04W 4/40*    (2018.01)

(52) U.S. Cl.
  CPC ........ *H04W 72/30* (2023.01); *G05B 13/0265* (2013.01); *H04W 4/40* (2018.02)

(58) Field of Classification Search
  CPC ..... H04W 4/40; H04W 72/30; G05B 13/0265
  See application file for complete search history.

(56) References Cited

U.S. PATENT DOCUMENTS

| 10,530,451 | B1 | 1/2020 | Bansal et al. |
| 12,099,357 | B1 * | 9/2024 | Ebrahimi Afrouzi ....... G06V 40/197 |
| 2019/0238658 | A1 | 8/2019 | Shimizu et al. |
| 2020/0128597 | A1 | 4/2020 | Shimizu et al. |
| 2020/0235997 | A1 | 7/2020 | Shimizu et al. |
| 2023/0090593 | A1 * | 3/2023 | Kim ........... H04L 1/00 370/252 |

FOREIGN PATENT DOCUMENTS

| CN | 112224202 A | 1/2021 | |
| GB | 2577741 A * | 4/2020 | ............ G06N 20/00 |

OTHER PUBLICATIONS

Sim et al., "An Online Context-Aware Machine Learning Algorithm for 5G mmWave Vehicular Communications," in IEEE/ACM Transactions on Networking, vol. 26, No. 6, pp. 2487-2500, Dec. 2018 (Year: 2018).*

(Continued)

*Primary Examiner* — Brian P Cox
(74) *Attorney, Agent, or Firm* — Dinsmore & Shohl LLP

(57) ABSTRACT

A controller for scheduling mmWave communication is provided. The controller is programmed to identify a plurality of states, each of the plurality of states indicating status of mmWave communication links among a plurality of nodes, calculate an updated value for each of the plurality of states iteratively based on a value iteration algorithm and a previous value for each of the plurality of states until the updated value for each of the plurality of states converges, and select one of the plurality of states based on the converged values for the plurality of states.

13 Claims, 10 Drawing Sheets

(56) References Cited

OTHER PUBLICATIONS

Javier Gozalvev, et al., "Heterogeneous V2X Networks for Connected and Automated Vehicles", IEEE Intelligent Transportation Systems; Universidad Miguel Hernández de Elche (Spain), Accessed Feb. 2021, URL: http://5gsummit.org/pretoria-17/Javier%20Gozalvez%205G%20Summit.pdf.

Seungmo Kim, et al., "Reinforcement Learning for Accident Risk-Adaptive V2X Networking", Virginia Polytechnic Institute and State University, Apr. 6, 2020, URL: https://www.semanticscholar.org/paper/Reinforcement-Learning-for-Accident-Risk-Adaptive-Kim-Kim/2caebb2841fc2a5cf22c4a418769367e01105d5c.

B. Coll-Perales, et al., "Sub-6GHZ Assisted MAC for Millimeter Wave Vehicular Communications", IEEE Communications Magazine, Mar. 2019, vol. 57, No. 3, pp. 125-131, URL: http://ieeexplore.ieee.org/stamp/stamp.jsp?tp=&arnumber=8642796&isnumber=8663974.

Akihito Taya, et al., "Concurrent Transmission Scheduling for Perceptual Data Sharing in mmWave Vehicular Networks", IEICE Transactions on Information and Systems, Mar. 2019, vol. E102-D, No. 5.

Ioannis Mavromatis, et al., "MmWave System for Future ITS: A MAC-layer Approach for V2X Beam Steering", Article; 2017 IEEE 86th Vehicular Technology Conference (VTC—Fall), Toronto, ON, May 24, 2017, pp. 1-6, URL: https://seis.bristol.ac.uk/~at15088/publications/vtc_mmWave.pdf.

\* cited by examiner

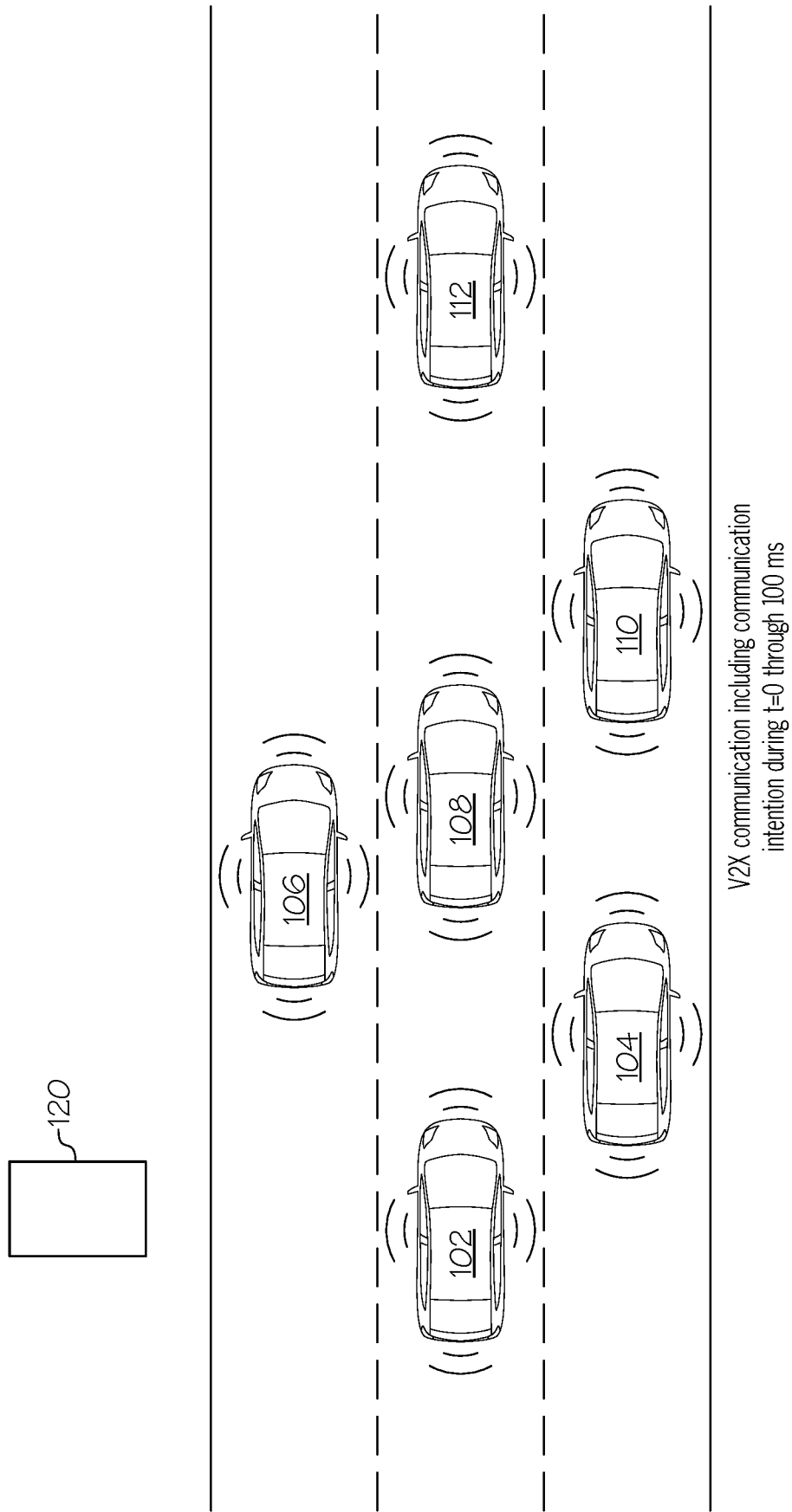

| States | Values |
|---|---|
| $s_1 = 000$ | $v(s_1) = 0$ |
| $s_2 = 001$ | $v(s_2) = 0$ |
| $s_3 = 010$ | $v(s_3) = 0$ |
| $s_4 = 011$ | $v(s_4) = 0$ |
| $s_5 = 100$ | $v(s_5) = 0$ |
| $s_6 = 101$ | $v(s_6) = 0$ |
| $s_7 = 110$ | $v(s_7) = 0$ |
| $s_8 = 111$ | $v(s_8) = 0$ |

| States | Values |
|---|---|
| $s_1 = 000$ | $v(s_1) = \frac{1}{3} \sum_{i=2,3,5} (r_{s_1}^a + v(s_i))$ |
| $s_2 = 001$ | $v(s_2) = \frac{1}{3} \sum_{i=1,4,6} (r_{s_2}^a + v(s_i))$ |
| $s_3 = 010$ | $v(s_3) = \frac{1}{3} \sum_{i=1,4,7} (r_{s_3}^a + v(s_i))$ |
| $s_4 = 011$ | $v(s_4) = ...$ |
| $s_5 = 100$ | $v(s_5) = ...$ |
| $s_6 = 101$ | $v(s_6) = ...$ |
| $s_7 = 110$ | $v(s_7) = ...$ |
| $s_8 = 111$ | $v(s_8) = ...$ |

$t = \Delta$ ms

FIG. 5B

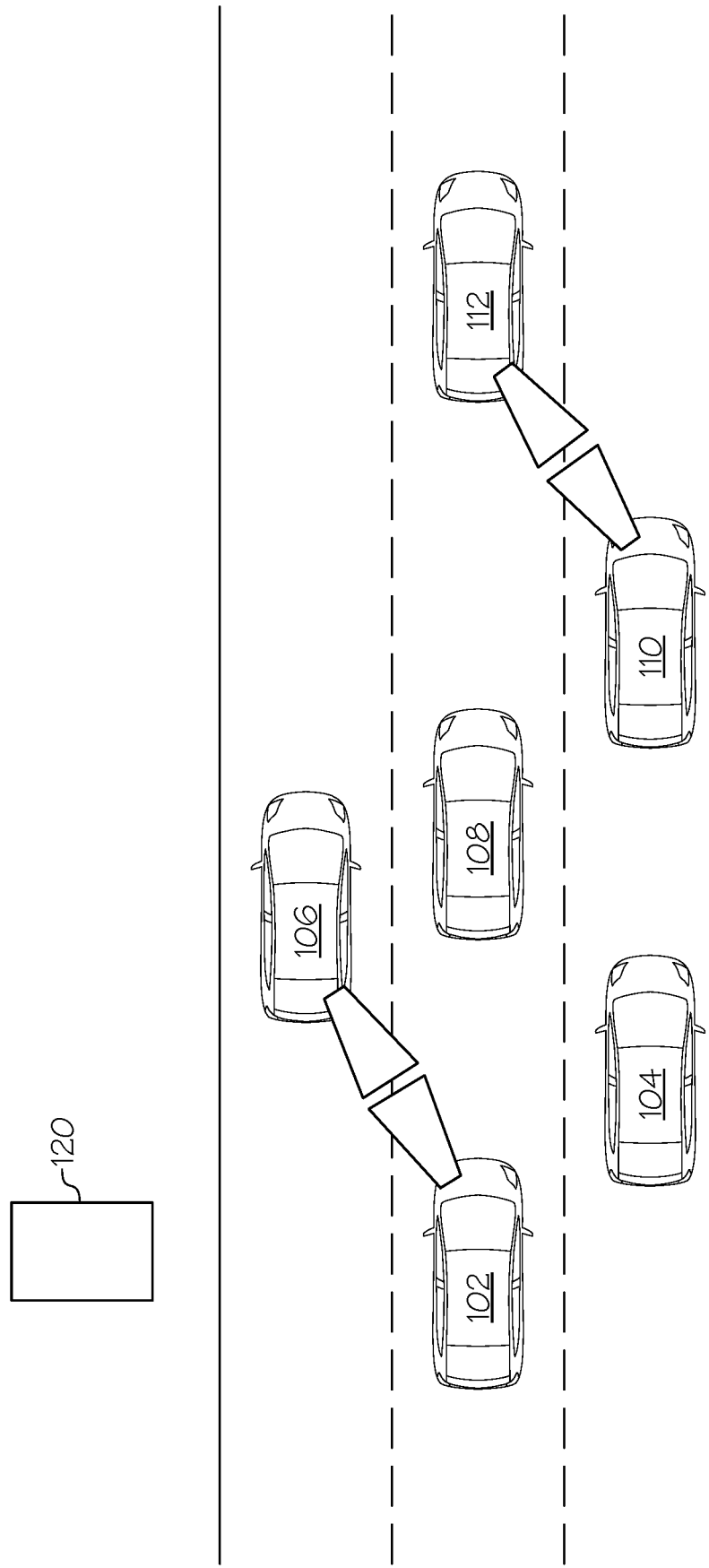

|   | 1 | 2 | 3 | 4 | 5 | 6 |
|---|---|---|---|---|---|---|
| 1 |   |   | √ |   | √ |   |
| 2 |   |   |   |   |   | √ |
| 3 | √ |   |   | √ |   |   |
| 4 |   |   | √ |   |   |   |
| 5 | √ |   |   |   |   |   |
| 6 |   | √ |   |   |   |   |

FIG. 6B

METHODS AND SYSTEMS FOR SCHEDULING MMWAVE COMMUNICATIONS USING REINFORCEMENT LEARNING

TECHNICAL FIELD

The present disclosure relates to methods and systems for scheduling mmWave communications using reinforcement learning to optimize the throughput of mmWave communication.

BACKGROUND

A mobile operating environment includes connected vehicles traveling at roadway speeds. One challenge to deploying millimeter wave (mmWave) communication technologies in mobile environments is that mmWave communication typically includes an execution of a beam alignment process. The mmWave communication between two endpoints is generally not possible without first completing the beam alignment process between these two endpoints. For example, appropriate beam pointing between a transmitter (e.g., a first endpoint) and a receiver (e.g., a second endpoint) is needed before exchanging data between the transmitter and the receiver.

IEEE 802.11ad is a standard that is defined for using mmWave to achieve high data throughput among nearby devices. However, the scenario targeted by 802.11ad is an indoor environment. When applied to vehicle-to-everything (V2X) scenarios, the link establishment process, which involves sending out beacons to announce its service and to help interested users join the network, seems tedious in the fleeting moment that two vehicles encounter each other. In addition, it is a complicated and time-consuming process to maximize the utility of mmWave communication among multiple endpoints.

Accordingly, a need exists for optimizing the throughput of mmWave communication among multiple vehicles in an efficient way.

SUMMARY

The present disclosure provides systems and methods for scheduling mmWave communications among connected vehicles.

In one embodiment, a controller for scheduling mmWave communication is provided. The controller is programmed to identify a plurality of states, each of the plurality of states indicating status of mmWave communication links among a plurality of nodes, calculate an updated value for each of the plurality of states iteratively based on a value iteration algorithm and a previous value for each of the plurality of states until the updated value for each of the plurality of states converges, and select one of the plurality of states based on the converged values for the plurality of states.

In another embodiment, a method for determining a mmWave communication schedule is provided. The method includes identifying a plurality of states, each of the plurality of states indicating status of mmWave communication links among a plurality of nodes; calculating an updated value for each of the plurality of states iteratively based on a value iteration algorithm and a previous value for each of the plurality of states until the updated value for each of the plurality of states converges; and selecting one of the plurality of states based on the converged values for the plurality of states.

In another embodiment, a vehicle system includes a controller programmed to: identify a plurality of states, each of the plurality of states indicating status of mmWave communication links among a plurality of vehicles; calculate an updated value for each of the plurality of states iteratively based on a value iteration algorithm and a previous value for each of the plurality of states until the updated value for each of the plurality of states converges; select one of the plurality of states based on the converged values for the plurality of states; and broadcast the selected state over a V2X channel.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4A depicts V2X communication including communication intentions among connected vehicles, according to one or more embodiments shown and described herein;

FIG. 5A depicts a table including a plurality of states and corresponding values at time t=0, according to one or more embodiments shown and described herein;

FIG. 5B depicts a table including a plurality of states and corresponding values at time t=Δ, according to one or more embodiments shown and described herein;

FIG. 5C depicts mmWave communication among vehicles after a set of mmWave communication links are selected, according to one or more embodiments shown and described herein;

FIG. 6B depicts a table indicating conflicts among multiple mmWave communication links, according to one or more embodiments shown and described herein.

DETAILED DESCRIPTION

Figure 4B:
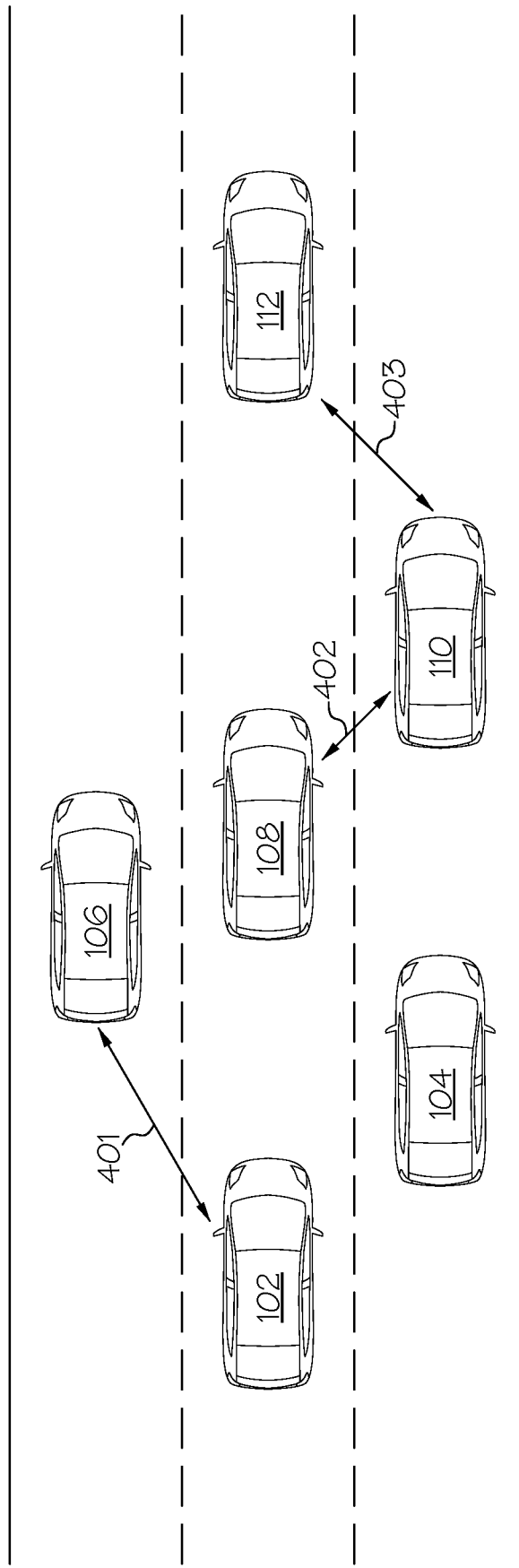
FIG. 4B depicts potential mmWave communication links among connected vehicles, according to one or more embodiments shown and described herein.

The embodiments disclosed herein include a controller for optimizing throughput of mmWave communication among multiple vehicles by calculating values for different states where different links are established among the multiple vehicles. By referring to FIGS. 2, 4A, 4B, the connected vehicle system 200 may identify a plurality of states, each of which indicates a status of mmWave communication links among a plurality of nodes. Specifically, the connected vehicle system 200 may receive communication intentions of other vehicles, as illustrated in FIG. 4A, and identify potential mmWave communication links 401, 402, 403, as shown in FIG. 4B. Then, the connected vehicle system 200 calculates an updated value for each of the plurality of states iteratively based on a value iteration algorithm and a previous value for each of the plurality of states until the updated value for each of the plurality of states converges. Calculating a value for each of the plurality of states will be described in detail with reference to Equations (1) through (5) below. Then, the connected vehicle system 200 selects one of the plurality of states based on the converged values for the plurality of states. For example, the connected vehicle system 200 may select the state that has the greatest value. The connected vehicle system 200 transmits information about the selected state (e.g., mmWave communication links 401 and 403 in FIG. 4B to be established). Based on the transmitted information, connected vehicles 102 and 106 conduct mmWave communication via the mmWave communication link 401, and connected vehicles 110 and 112 conduct mmWave communication via the mmWave communication link 403 as illustrated in FIG. 5C.

According to the present disclosure, the present system selects links among multiple vehicles that optimize the throughput of mmWave communication among the multiple vehicles. The selection of links may be determined using a reinforcement learning engine which calculates values for different states where different links are established among the multiple vehicles.

Figure 1:
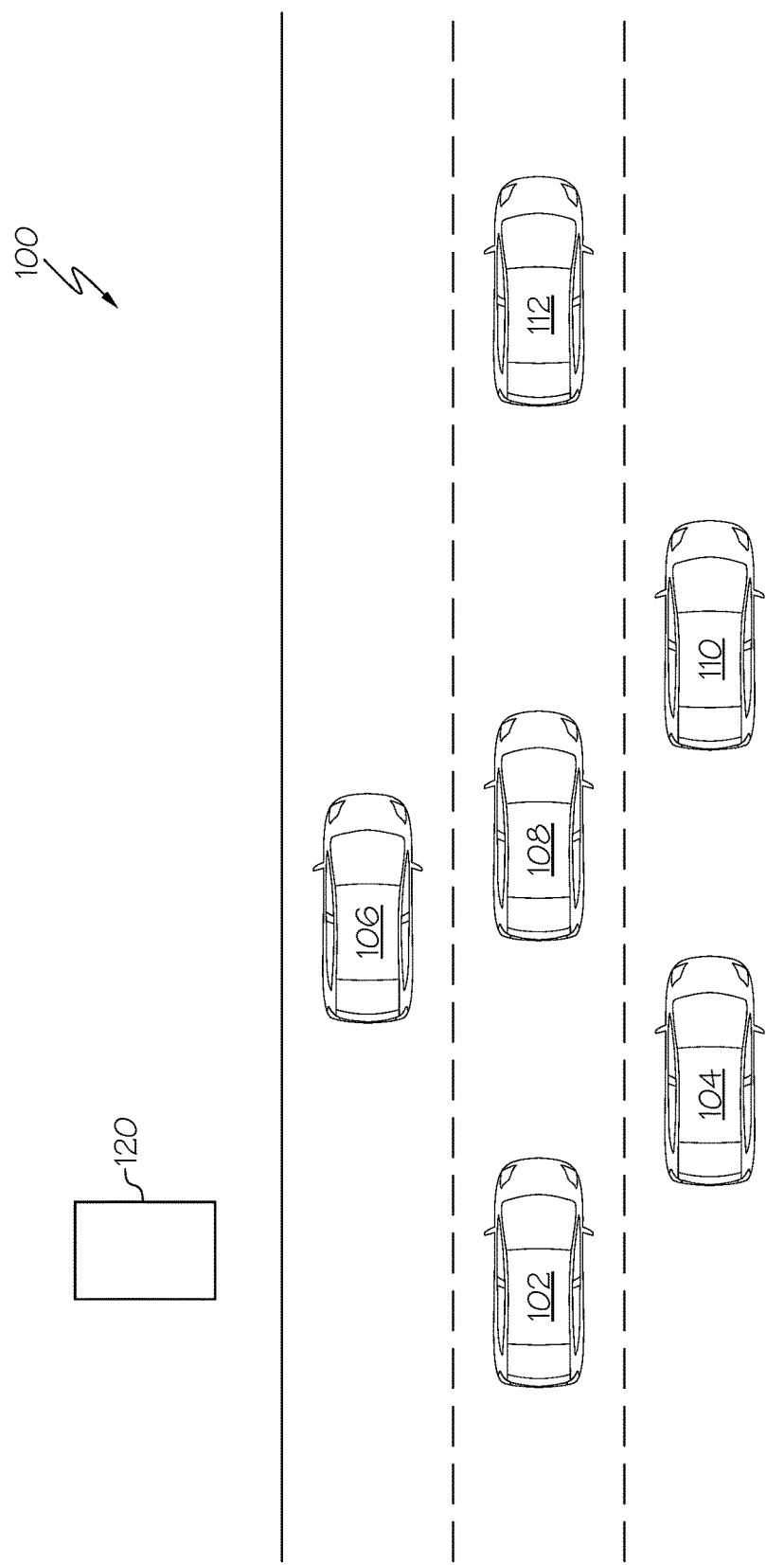
FIG. 1 schematically depicts a system for scheduling mmWave communication among multiple connected vehicles, according to one or more embodiments shown and described herein.

FIG. 1 schematically depicts a system for scheduling mmWave communication among multiple connected vehicles, according to one or more embodiments shown and described herein.

In embodiments, the system 100 may include a plurality of connected vehicles 102, 104, 106, 108, 110, 112, and a server 120. While FIG. 1 illustrates six connected vehicles 102, 104, 106, 108, 110, 112 conducting mmWave communication, more than or less than six connected vehicles may communicate with each other via mmWave communication.

Each of the connected vehicles 102, 104, 106, 108, 110, 112 may communicate with the server 120 via mmWave communication and/or V2X communication. The server 120 may be a remote server such as a cloud server. In some embodiments, the server 120 may be a local server including, but not limited to, a roadside unit, an edge server, and the like. The server 120 may communicate with vehicles in an area covered by the server 120. The server 120 may communicate with other servers that cover different areas. The server 120 may communicate with a remote server and transmit information collected by the server 120 to the remote server. The server 120 may include its own scheduler mmWave communication.

Each of the connected vehicles 102, 104, 106, 108, 110, 112 may be a vehicle including an automobile or any other passenger or non-passenger vehicle such as, for example, a terrestrial, aquatic, and/or airborne vehicle. In some embodiments, one or more of the connected vehicles 102, 104, 106, 108, 110, 112 may be an unmanned aerial vehicle (UAV), commonly known as a drone. In some embodiments, devices other than connected vehicles, such as mobile phones, may communicate with each other using mmWave communication.

Each of the connected vehicles 102, 104, 106, 108, 110, 112 may be equipped with communication hardware for V2X DSRC and mmWave communication. For example, each of the connected vehicles 102, 104, 106, 108, 110, 112 may be equipped with a DSRC transceiver and a mmWave transceiver. Each of the connected vehicles 102, 104, 106, 108, 110, 112 may communicate with each other over two different channels (e.g., DSRC channel and mmWave channel) independently. Each of the connected vehicles 102, 104, 106, 108, 110, 112 may include a reinforcement learning (RL) engine module that determines an optimal status of mmWave communication links among the vehicles. In addition, the server 120 may include a reinforcement learning (RL) engine module that determines an optimal status of mmWave communication links among the vehicles. The details of the RL engine module will be described with reference to FIGS. 2, and 5A, 5B below.

Figure 2:
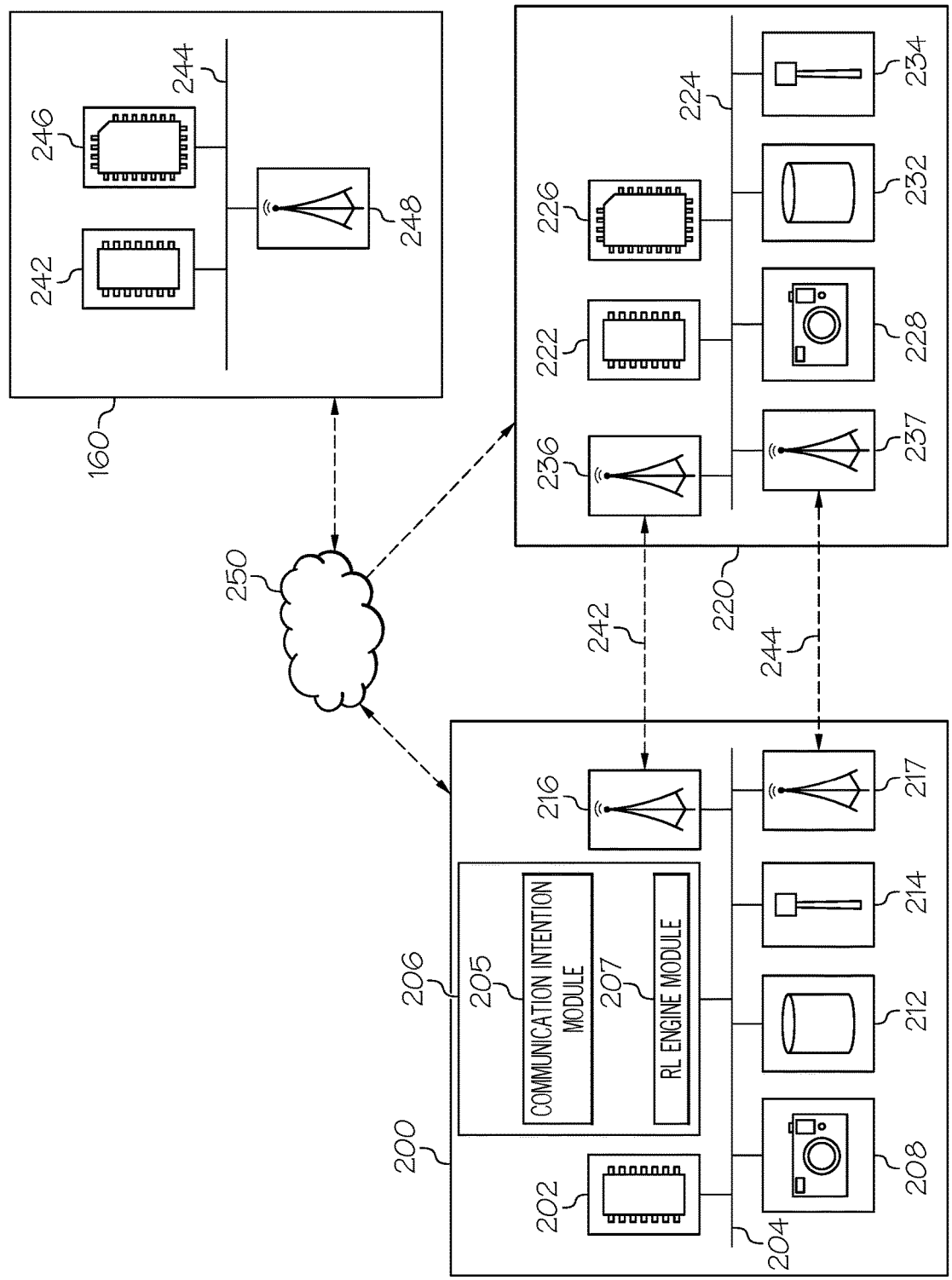
FIG. 2 depicts a schematic diagram of a system for scheduling mmWave communication among multiple connected vehicles, according to one or more embodiments shown and described herein.

FIG. 2 depicts a schematic diagram of a system for scheduling mmWave communication among multiple connected vehicles, according to one or more embodiments shown and described herein. The system includes connected vehicle systems 200 and 220, and the server 160.

It is noted that, while the connected vehicle systems 200 and 220 are depicted in isolation, each of the connected vehicle systems 200 and 220 may be included within a vehicle in some embodiments, for example, respectively within each of the connected vehicles 102, 104, 106, 108, 110, 112 of FIG. 1. In embodiments in which each of the connected vehicle systems 200 and 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the connected vehicle system 200.

The one or more memory modules 206 includes a communication intention module 205, and an RL engine module 207. The communication intention module 205, and the RL engine module 207 as a whole may operate as a scheduler for scheduling mmWave communication. Each of the communication intention module 205, and the RL engine module 207 may be a program module in the form of operating systems, application program modules, and other program modules stored in one or more memory modules 206. In some embodiments, the program module may be stored in a remote storage device that may communicate with the connected vehicle system 200. Such a program module may include, but is not limited to, routines, subroutines, programs, objects, components, data structures, and the like for performing specific tasks or executing specific data types as will be described below.

The communication intention module 205 may obtain the communication intention of the connected vehicle system 200 (e.g., the connected vehicle 102 in FIG. 1) as well as communication intentions of other connected vehicles (e.g., the connected vehicles 104, 106, 108, 110, 112). The communication intentions of other connected vehicles may be received from other vehicles via DSRC communication. For example, by referring to FIG. 4A, each of the connected vehicles 104, 106, 108, 110, 112 may include its communication intention in DSRC packets and transmit the DSRC packets via DSRC communication. The connected vehicle 102 may receive all or some of the communication intentions of the connected vehicles 104, 106, 108, 110, 112.

Referring back to FIG. 2, the RL engine module 207 determines an optimal set of communication links among multiple connected vehicles based on the communication intentions obtained by the communication intention module 205. Specifically, the RL engine module 207 identifies potential mmWave communication links among connected vehicles based on the communication intentions of the connected vehicles. For example, by referring to FIG. 4A, the connected vehicle 102 obtains communication intentions of the connected vehicle 102 as well as the communication intentions of the connected vehicles 104, 106, 108, 110, 112. Based on the communication intentions, the RL engine module 207 identifies three potential mmWave communication links 401, 402, 403 as shown in FIG. 4B. Since there are three potential links, 8 states ($S_1$ through $S_8$) may exist as shown in FIG. 5A. Each of the states represents whether each of the potential links is established or not. Zero means that a corresponding link is not established, and one means that a corresponding link is established. For example, state $S_2$ (001) represents that the mmWave communication links 401 and 402 are not established and the mmWave communication link 403 is established. State $S_7$ (110) represents that the mmWave communication links 401 and 402 are established and the mmWave communication link 403 is not established. The initial value v for each of the states is set as 0 as indicated in FIG. 5A.

The RL engine module 207 implements iterative calculations of value v until the value converges. Specifically, actions of adding a link or removing a link are made to the current state. For example, from current state $S_2$ (001), the third link may be removed to become $S_1$ (000), the first link may be added to become $S_6$ (101) or the second link may be added to become $S_4$ (011). The RL engine module 207 calculates a reward for adding a link or removing a link. For example, regarding the addition of a link i to state s, if there is no conflict between the link i and other links in state s, the reward is defined as:

$$r_s^{+i} = -\text{weight}(i) \qquad\qquad \text{Equation (1)}$$

If there is any conflict, the reward is defined as:

$$r_s^{+i} = 99 \times \text{the number of conflicts} - \text{weight}(i) \qquad \text{Equation (2)}$$

Regarding the removal of a link i from state s, if there is no conflict between i and other links in s, the reward is defined as:

$$r_s^{-i} = \text{weight}(i) \qquad\qquad \text{Equation (3)}$$

If there is any conflict, the reward is defined as:

$$r_s^{-i} = -99 \times \text{the number of conflicts} + \text{weight}(i) \qquad \text{Equation (4)}$$

The addition or removal of a link is iteratively implemented, and the value after (k+1)th iteration is defined as:

$$v^{k+1}(s) = \Sigma_{a \in A} \pi^k(a|s)(r_s^a + \Sigma_{s' \in S} P_{ss'}^a v^k(s')) \qquad \text{Equation (5)}$$

$v^{k+1}(s)$ represent the value of state s at the (k+1)th iteration. a is the action the RL engine module takes. A is the action set, $\pi^k$ (a|s) is the policy at the kth iteration given the current state s, which is the probability for the actions given s. $r_s^a$ is the reward of taking action a given state s. $\gamma$ is a decay rate. $P_{ss'}^a$ is the transition probability from state s to s' when taking action a. The policy here is a random policy.

The value iteration is implemented until the values v (e.g., $v(s_1)$ through $v(s_8)$ in FIG. 5B) for the states are converged. Once all values are converged, the RL engine module 207 selects the state whose value v is the largest value. For example, the RL engine module 207 determines that $v(s_6)$ is the largest among $v(s_1)$ through $v(s_8)$, and selects the state $S_6$ (101) that represents the mmWave communication links 401 and 403 being established. Then, the RL engine module 207 may send out DSRC packets including information about the mmWave communication links 401 and 403 to other connected vehicles. Based on the information about the mmWave communication links 401 and 403, connected vehicles conduct mmWave communication for a certain period of time, e.g., for 100 ms. For example, the connected vehicles 102 and 106 conduct mmWave communication, and the connected vehicles 110 and 112 conduct mmWave communication as illustrated in FIG. 5C.

Referring still to FIG. 2, the connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the connected vehicle 102.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein to develop a fuller real-time traffic image. Ranging sensors like radar may be used to obtain a rough depth and speed information for the view of the connected vehicle system 200.

The connected vehicle system 200 comprises a satellite antenna 214 coupled to the communication path 204 such that the communication path 204 communicatively couples the satellite antenna 214 to other modules of the connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the connected anchor vehicle 102. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the connected vehicle system 200 comprises V2X network interface hardware 216 for communicating data with connected vehicles, the server 160, or other infrastructures. The V2X network interface hardware 216 may enable various V2X communication including, but not limited to, 5.9 GHz DSRC, LTE-V2X, LTE-D2D, 5G-V2X, ITS-G5, ITS-Connect, LPWAN, visible light communication, and the like. The V2X network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the V2X network interface hardware 216 may include an antenna, a modem, LAN port, WiFi card, WiMAX card, mobile communications hardware, near-field communication hardware, satellite communication hardware, and/or any wired or wireless hardware for communicating with other networks and/or devices. In one embodiment, the V2X network interface hardware 216 includes hardware configured to operate in accordance with the Bluetooth® wireless communication protocol. The V2X network interface hardware 216 of the connected vehicle system 200 may transmit its data to the connected vehicle system 220 or the server 160. For example, the V2X network interface hardware 216 of the connected vehicle system 200 may transmit packets that include the communication intentions of the connected vehicle system 200, the transmission schedule of the connected vehicle system 200, and transmission schedule of other vehicle systems.

Still referring to FIG. 2, the connected vehicle system 200 comprises mmWave interface hardware 217 for communicating data with connected vehicles, the server 160, or other infrastructures. The mmWave interface hardware 217 may enable the connected vehicle system 200 to perform directional mmWave communication with another connected vehicle. For example, by referring to FIG. 5C, the mmWave interface hardware 217 of the connected vehicle 102 allows the connected vehicle 102 to communicate with the connected vehicle 106 over mmWave radios. While FIG. 2 illustrates the V2X network interface hardware 216 and the mmWave interface hardware 217 separately, the connected vehicle system 200 may include a single interface hardware that provides both V2X and mmWave communication functionalities.

The connected vehicle system 200 may connect with one or more external vehicle systems (e.g., the connected vehicle system 220) and/or external processing devices (e.g., the server 160) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the connected vehicle system 200 may be communicatively coupled to the server 160 by the network 250. In one embodiment, the network 250 may include one or more computer networks (e.g., a personal area network, a local area network, or a wide area network), cellular networks, satellite networks and/or a global positioning system and combinations thereof. Accordingly, the connected vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (WiFi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 160 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include an RL engine module similar to the RL engine module 207. The RL engine module of the server 160 may identify a plurality of states based on communication intentions from the connected vehicles 102, 104, 106, 108, 110, 112, calculate values for a plurality of states iteratively based on a value iteration algorithm, and select a state that has the largest value. Then, the server transmits information about the links of the selected state to the connected vehicles 102, 104, 106, 108, 110, 112. The communication path 244 may be similar to the communication path 204 in some embodiments.

Still referring to FIG. 2, the connected vehicle system 220 includes one or more processors 222, one or more memory modules 226, one or more sensors 228, one or more vehicle sensors 232, a satellite antenna 234, V2X network interface hardware 236, mmWave interface hardware 237 and a communication path 224 communicatively connected to the other components of the connected vehicle system 220. The components of the connected vehicle system 220 may be structurally similar to and have similar functions as the corresponding components of the connected vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, the V2X network interface hardware 236 corresponds to the V2X network interface hardware 216, and the mmWave interface hardware 237 corresponds to the mmWave interface hardware 217).

Figure 3:
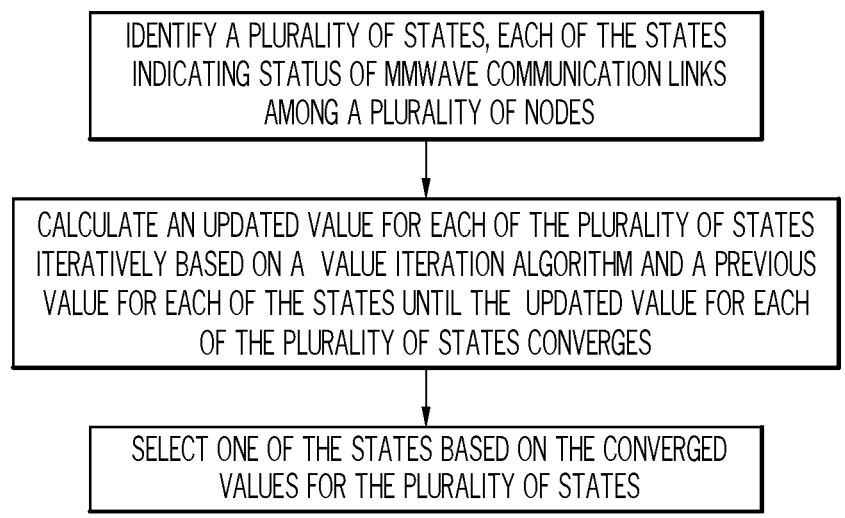
FIG. 3 depicts a flowchart for selecting a state among a plurality of states, according to one or more embodiments shown and described herein.

FIG. 3 depicts a flowchart for selecting a state among a plurality of states, according to one or more embodiments shown and described herein.

In step 310, a controller of a connected vehicle identifies a plurality of states. Each of the states indicates the status of mmWave communication links among a plurality of nodes, such as a plurality of connected vehicles. Specifically, the controller of the connected vehicle may receive communication intentions from other connected vehicles and identify the plurality of states based on the communication intentions received from other connected vehicles. For example, by referring to FIG. 4A, the connected vehicle 102 obtains communication intentions of the connected vehicle 102 as well as the communication intentions of the connected vehicles 104, 106, 108, 110, 112. Based on the communication intentions, the RL engine module 207 identifies three potential mmWave communication links 401, 402, 403 as shown in FIG. 4B. Since there are three potential links, 8 states may present as shown in FIG. 5A. Each of the states represents whether each of the potential links is established or not. Zero means that a corresponding link is not established, and one means that a corresponding link is established. The initial value v for each of the states is set as 0 as indicated in FIG. 5A.

In step 320, the controller of the connected vehicle calculates an updated value for each of the plurality of states iteratively based on a value iteration algorithm and a previous value for each of the states until the updated value for each of the plurality of states converges. For example, the RL engine module 207 of the connected vehicle 102 implements iterative calculations of value v until the value converges. Specifically, actions of adding a link or removing a link are made to the current state. For example, from current state $S_3$ (010), the second link may be removed to become $S_1$ (000), the first link may be added to become $S_7$ (110), or the third link may be added to become $S_4$ (011). The RL engine module 207 calculates a reward for adding a link or removing a link with reference to Equations (1) through (4) above. Then, the RL engine module 207 calculates an updated value for each of the plurality of states iteratively based on a value iteration algorithm and a previous value for each of the states. The value iteration is implemented until the values v (e.g., $v(s_1)$ through $v(s_8)$ in FIG. 5B) for the states are converged.

In step 330, the controller of the connected vehicle selects one of the states based on the converged values for the plurality of states. For example, the RL engine module 207 determines that $v(s_6)$ is the largest among the values, and selects the state $S_6$ (101). Then, the RL engine module 207 may send out DSRC packets including information about a set of mmWave communication links 401 and 403 to other connected vehicles. Based on the information about the set of mmWave communication links 401 and 403, connected vehicles conduct mmWave communication for a certain period of time, e.g., for 100 milliseconds. For example, the connected vehicles 102 and 106 conduct mmWave communication, and the connected vehicles 110 and 112 conduct mmWave communication as illustrated in FIG. 5C.

Figure 6A:
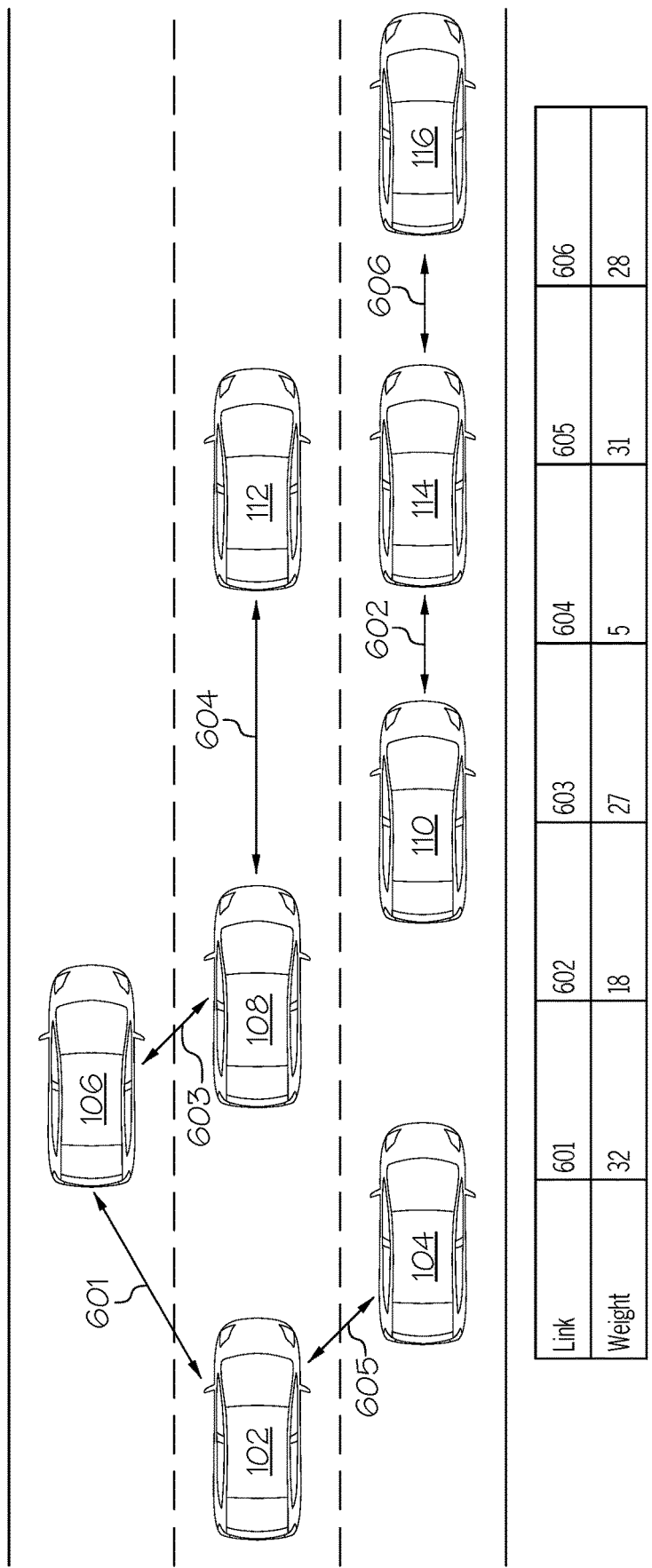
FIG. 6A depicts potential mmWave communication links among connected vehicles and weights corresponding to the mmWave communication links, according to one or more embodiments shown and described herein.

FIG. 6A depicts another example of scheduling mmWave communication among multiple connected vehicles, according to one or more embodiments shown and described herewith.

In embodiments, an RL engine module of a connected vehicle or an edge server identifies potential mmWave communication links. For example, by referring to FIG. 6A, the RL engine module 207 of the connected vehicle 102 obtains communication intentions of the connected vehicle 102 as well as the communication intentions of the connected vehicles 104, 106, 108, 110, 112, 114, 116. Based on the communication intentions, the RL engine module 207 identifies six potential mmWave communication links 601, 602, 603, 604, 605, 606 as shown in FIG. 6A. Since there are six potential links, 64 states (000000 through 111111) may exist. Each of the states represents whether each of the potential links is established or not. Zero means that a corresponding link is not established, and one means that a corresponding link is established. For example, state $S_2$ (000001) represents that the mmWave communication links 601 through 605 are not established and the mmWave communication link 606 is established. The initial value v for each of the states is set as 0.

The RL engine module 207 implements iterative calculations of value v until the value converges. Specifically, actions of adding a link or removing a link are made to the current state. The iterative calculations of value v may be using Equations (1) through (5) described above.

Regarding weight parameters in Equations (1) through (4), each mmWave communication link may be assigned with a certain weight. For example, as illustrated in FIG. 6A, the mmWave communication links 601, 602, 603, 604, 605, 606 are assigned with the weights of 32, 18, 27, 5, 31, 28, respectively. The weight may be determined based on various factors including a type of communication, a type of data to be communicated, a type of application being used by connected vehicles, a type of connected vehicles, and the like.

Figure 6B:
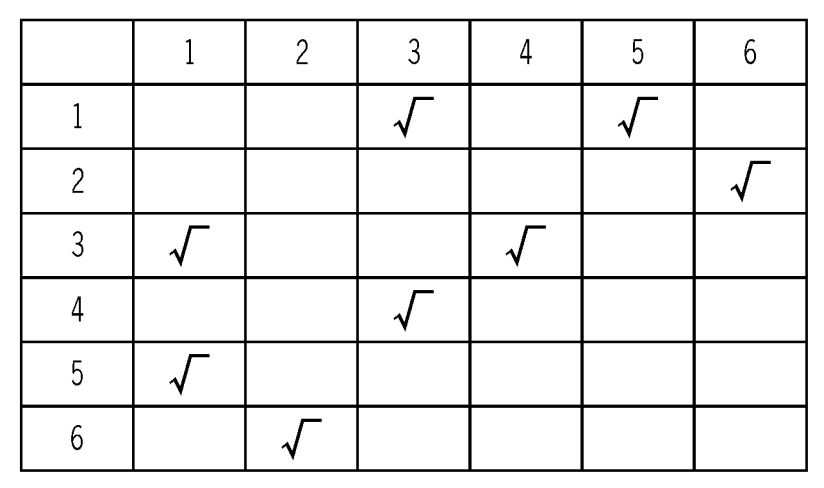

Regarding conflict parameters in Equations (2) and (4), FIG. 6B depicts a conflict table among the mmWave communication links. For example, the mmWave communication link 601 conflicts with the mmWave communication link 603 when both links are used at the same time because both links involve the connected vehicle 106. Similarly, the mmWave communication link 601 conflicts with the mmWave communication link 605 when both links are used at the same time. Additionally, the mmWave communication link 602 conflicts with the mmWave communication link 606, and the mmWave communication link 603 conflicts with the mmWave communication link 604.

Figure 7:
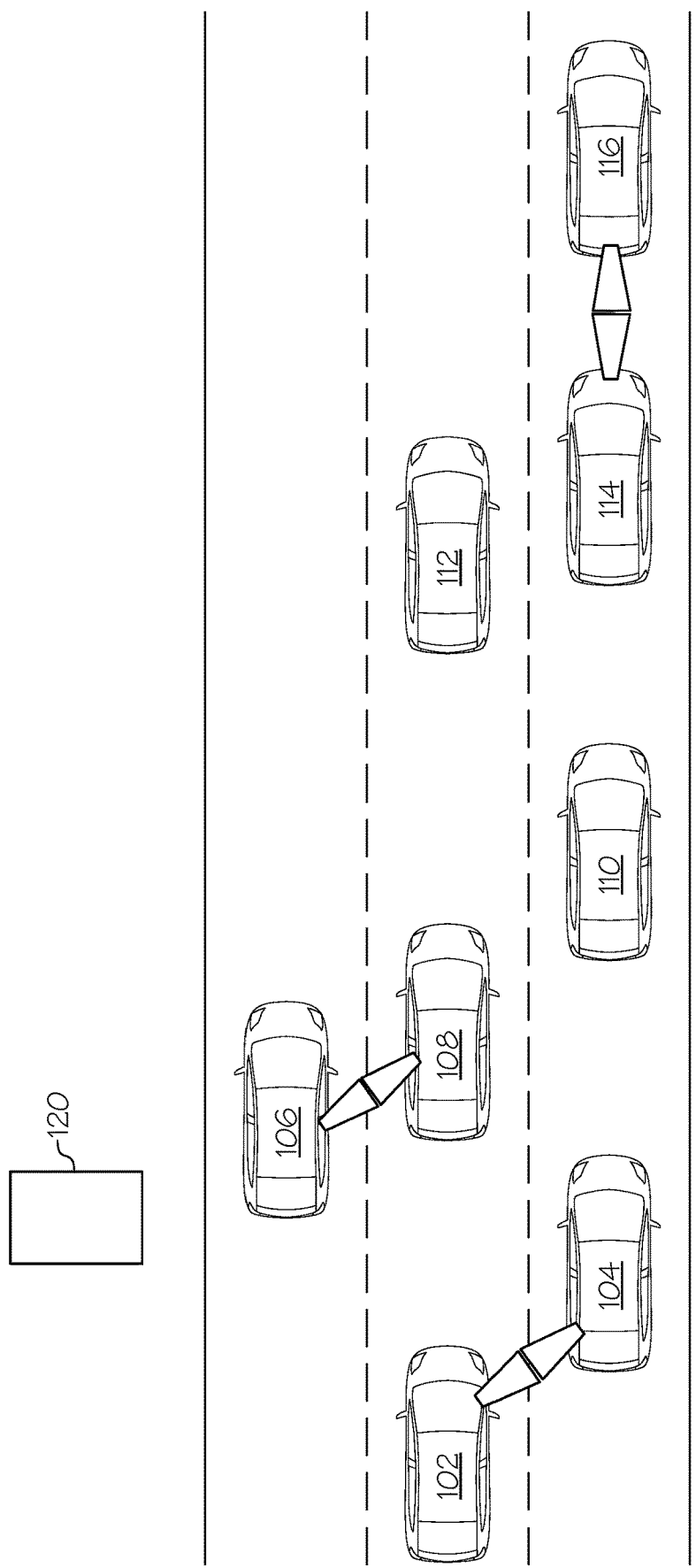
FIG. 7 depicts mmWave communication among vehicles after a set of mmWave communication links are selected, according to one or more embodiments shown and described herein.

The value iteration is implemented until all 64 values corresponding to 64 states are converged. Once all values are converged, the RL engine module 207 selects the state whose value v is the largest value. For example, the RL engine module 207 determines that $v(s_{12})$ is the largest among the values, and selects the state $S_{12}$ (001011), which represents the mmWave communication links 603, 605, 606 to be established. Then, the RL engine module 207 may send out DSRC packets including information about a set of mmWave communication links 603, 605, and 606 to other connected vehicles. Based on the information about the set of mmWave communication links 603, 605, and 606 3, connected vehicles conduct mmWave communication for a certain period of time, e.g., for 100 milliseconds. For example, the connected vehicles 102 and 104 conduct mmWave communication, the connected vehicles 106 and 108 conduct mmWave communication, and the connected vehicles 114 and 116 conduct mmWave communication as illustrated in FIG. 7.

It should be understood that embodiments described herein are directed to a controller programmed to identify a plurality of states, each of the states indicating a status of mmWave communication links among a plurality of nodes, calculate an updated value for each of the plurality of states iteratively based on a value iteration algorithm and a previous value for each of the states until the updated value for each of the plurality of states converges, and select one of the states based on the converged values for the plurality of states.

According to the present disclosure, the present system selects links among multiple vehicles that optimize the throughput of mmWave communication among the multiple vehicles. The selection of links may be determined using a reinforcement learning engine which calculates values for different states where different links are established among the multiple vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A controller which is configured to:
   receive an intent to communicate from one or more of a plurality of nodes;
   identify a plurality of states based at least in part on the one or more intents to communicate, each of the plurality of states indicating status of mmWave communication links among the plurality of nodes;
   calculate an updated value for each of the plurality of states iteratively based on a value iteration algorithm and a previous value for each of the plurality of states until the updated value for each of the plurality of states converges; and
   select one of the plurality of states based on the converged values for the plurality of states, wherein:
   the updated value for each of the plurality of states is calculated at least based on a reward value and a transition probability from a first state to a second state; and
   the reward value is calculated based on a weight value related to a link to be added or removed and a number of conflicts due to an addition or a removal of the link.

2. The controller of claim 1, wherein the controller is configured to:
   broadcast information about the selected state over a V2X channel.

3. The controller of claim 1, wherein the updated value for each of the plurality of states is calculated using Bellman equation.

4. The controller of claim 1, wherein:
each of the mm Wave communication links is associated with a weight parameter; and
the updated value for each of the plurality of states is calculated further based on the weight parameter.

5. The controller of claim 1, wherein the controller is configured to:
broadcast information about the selected state over a 5.9 GHz V2X channel.

6. The controller of claim 1, wherein the plurality of nodes include a plurality of connected vehicles.

7. The controller of claim 1, wherein the plurality of nodes include an edge server.

8. The controller of claim 1, wherein one or more of the plurality of states include mm Wave communication links that conflict each other.

9. A method comprising:
receiving an intent to communicate from one or more of a plurality of nodes;
identifying a plurality of states based at least in part on the one or more intents to communicate, each of the plurality of states indicating status of mm Wave communication links among the plurality of nodes;
calculating an updated value for each of the plurality of states iteratively based on a value iteration algorithm and a previous value for each of the plurality of states until the updated value for each of the plurality of states converges; and
selecting one of the plurality of states based on the converged values for the plurality of states, wherein:
the updated value for each of the plurality of states is calculated at least based on a reward value and a transition probability from a first state to a second state; and
the reward value is calculated based on a weight value related to a link to be added or removed and a number of conflicts due to an addition or a removal of the link.

10. The method of claim 9, further comprising:
broadcasting information about the selected state over a V2X channel.

11. The method of claim 9, wherein the updated value for each of the plurality of states is calculated using Bellman equation.

12. The method of claim 9, wherein:
each of the mm Wave communication links is associated with a weight parameter; and
the updated value for each of the plurality of states is calculated further based on the weight parameter.

13. A vehicle system comprising:
a controller which is configured to:
receive an intent to communicate from one or more of a plurality of nodes;
identify a plurality of states based at least in part on the one or more intents to communicate, each of the plurality of states indicating status of mmWave communication links among the plurality of nodes;
calculate an updated value for each of the plurality of states iteratively based on a value iteration algorithm and a previous value for each of the plurality of states until the updated value for each of the plurality of states converges;
select one of the plurality of states based on the converged values for the plurality of states; and
broadcast the selected state over a V2X channel, wherein:
the updated value for each of the plurality of states is calculated at least based on a reward value and a transition probability from a first state to a second state; and
the reward value is calculated based on a weight value related to a link to be added or removed and a number of conflicts due to an addition or a removal of the link.

* * * * *